United States Patent Office 3,250,786
Patented May 10, 1966

3,250,786
PREPARATION OF CARBOXYLIC ACIDS FROM SOLVENT EXTRACTS
Louis A. Joo, Johnson City, Tenn., and Theodore H. Szawlowski, Wonder Lake, Ill., assignors, by mesne assignments, to Union Oil Company of California, Los Angeles, Calif., a corporation of California
No Drawing. Filed Dec. 26, 1962, Ser. No. 247,358
14 Claims. (Cl. 260—327)

This invention relates to a method of fractionating complex acid mixtures derived from sulfur-containing aromatic compounds of petroleum origin and to the fractions so obtained. More particularly, this invention relates to a method of dividing mixed complex carboxylic acids, derived from sulfur-containing aromatic compounds, such as solvent extracts obtained in the solvent extraction of mineral lubricating oils using a solvent selective for aromatic compounds, hydrogenated solvent extracts, FCC recycle stock, decant oil from FCC processes and mixtures thereof, into fractions of reduced complexity.

This invention is based on the discovery that the mixed complex carboxylic acids prepared from solvent extracts by metalation, carbonation and acidification are divided into fractions of reduced complexity and different acid number by (1) dissolving the mixed acids in an excess of aqueous caustic, (2) adding a saturated salt solution and ether to effect three phase separation, (3) separating the phases, and (4) separating the acids from each of the phases by individual acidification. By this procedure it has been found that the composition of the phases is as follows:

Upper phase—an ether solution of color bodies and unsaponifiables

Middle phase—an ether-water solution of predominately monocarboxylic complex acids, and Lower phase—an aqueous solution of di-, tri-, and higher complex polybasic acids Since the individual acid fractions of the acid mixture find separate utilities in the preparation of derivatives, such as amides, aminoamides, polyesters, and the like, it is highly desirable that a method be found which accomplishes these results. To this end the instant invention is directed as applied to a uniquely complex and useful new class of complex carboxylic acids.

The method of this invention represents an improvement over the methods described in copending application Serial No. 161,355, filed December 22, 1961, with the exception that it is limited to the mixtures of complex carboxylic acids derived from sulfur-containing aromatic compounds of petroleum origin and the methods of the aforesaid copending applications can be applied to acid mixtures from other sources. The method of this invention uses a modified salting-out procedure to separate complex carboxylic acid mixtures where less complex systems or methods such as distillation, extraction, crystallization, etc., are totally ineffective.

Accordingly, it becomes a primary object of this invention to provide a process for separating complex acid mixtures, derived from sulfur-containing aromatic compounds of petroleum origin, into fractions of different acid number.

Another object is to provide new fractions of said acids, prepared by the method of this invention.

Still another object is to provide a process of separating mixtures of complex mono-, di- and polycarboxylic acids derived from solvent extracts, hydrogenated solvent extracts, FCC recycle stocks, and decant oil from the FCC process into fractions which are predominantly monocarboxylic, and fractions which are predominantly di- and polycarboxylic. These and other objects of this invention will be described or become apparent as the specification proceeds.

In order to demonstrate the invention the following nonlimiting examples are given:

EXAMPLE I

A 2.17 g. portion of mixed complex carboxylic acids derived from solvent extracts, as hereinafter defined, was pulverized and dissolved in 60 ml. of water containing 2.39 g. NaOH and 10 ml. ether. This mixture was poured into a separatory funnel containing 60 ml. additional ether, and shaken vigorously. Then, 10.2 ml. of saturated NaCl solution (containing 2.96 g. NaCl) was added, and the mixture was shaken vigorously for 2 minutes. After settling, a three-phase system emerged: a light-yellow, upper phase, consisting of unsaponifiables in ether; a dark-brown, middle phase, consisting of sodium salts of monobasic acids (including naphthenic acids) dissolved in ether-water mixture; a lower phase containing a water solution of sodium salts of di-, tri-, and higher polybasic acids. Then, the phases were separated and acidified separately with HCl, and the organic acids released were extracted with ether. Finally, each ether extract was dried, yielding the products in the tabulation below:

Table I

| Original Charge | | Fractional Products | | |
|---|---|---|---|---|
| | | From Upper Phase | From Middle Phase | From Lower Phase |
| Wt. (g.) | 2.17 | 0.16 | 1.03 | 0.98. |
| Percent of Charge | 100 | 7.3 | 47.5 | 45.2. |
| Acid No | 218 | 37 | 160 | 245. |
| Equiv. Wt | 257 | | 351 | 229. |
| Appearance | Dk. brown crystalline | Yellow soft solid | Very dk. brown gum. prod | Amber color crystalline. |
| Essential Composition | Mix. of Mono- Di-, Tri- and higher polybasic acids. | Unsap | Monobasic acids incl. naphthenic acids. | Di-, Tri-, and higher polybasic acids. |

EXAMPLE II

A 13.43 g. portion of mixed complex carboxylic acids derived from solvent extracts was pulverized and dissolved in 250 ml. of water containing 9.45 g. of NaOH and 25 ml. of ether. This mixture was poured into a separatory funnel containing 100 ml. additional ether and shaken vigorously. Then 62 ml. of saturated NaCl solution (containing 17.7 g. of NaCl) was added and the mixture was shaken vigorously for two minutes. After settling, a three-phase system emerged: a light yellow upper phase consisting of unsaponifiables in ether; a dark-brown, middle phase consisting of sodium salts of monobasic acids (including naphthenic acids) dissolved in ether-water mixture; a lower phase containing a water solution of sodium salts of di-, tri-, and higher polybasic acids. The phases were separated and acidified separately with HCl, and the organic acids released were extracted with ether. Each ether extract was dried, yielding the products described below:

in 30 ml. of water containing 0.93 g. of NaOH and 5 ml. of ether, this mixture was poured into a separatory funnel

*Table II*

| Original Charge | | Fractional Products | | |
|---|---|---|---|---|
| | | From Upper Phase | From Middle Phase | From Lower Phase |
| Wt. (g.) | 13.43 | 0.44 | 9.21 | 3.78. |
| Percent of Charge | 100 | 3.3 | 68.6 | 28.1. |
| Acid No. of Frac | 218 | 18 | 178 | 309. |
| Equivalent Wt | 257 | | 315 | 181. |
| Appearance | Dark brown color, crystall | Yellow color, soft solid | very dk. brown, soft gum. product. | Amber color crystalline. |
| Essential Composition | Mixture of Mono-, Di-, Tri-, and higher poly basic acids. | Unsap. color bodies | Monobasic acids (incl. naphthenic acids). | Di-, Tri-, and higher polybasic acids. |

EXAMPLE III

A 3.22 g. portion of a mixture of complex carboxylic acids derived from solvent extracts was pulverized and dissolved in 100 ml. of water containing 3.3 g. of NaOH and 10 ml. of ether, this mixture was poured into a separatory funnel containing 100 ml. additional ether, and the funnel was shaken vigorously. Then, 20 ml. of saturated NaCl solution (containing 5.7 g. of NaCl) was added and the mixture was shaken vigorously for 2 minutes. After settling, a three phase system emerged: a light yellow, upper phase, consisting of unsaponifiables in ether; a dark-brown, middle phase, consisting of sodium salts of monobasic acids (including naphthenic acids) dissolved in ether-water mixture; a lower phase containing a water solution of sodium salts of di-, tri-, and higher polybasic acids. Each phase was separated and acidified separately with HCl, and the organic acids released were extracted with ether. Finally, each ether extract was dried, yielding the products described below:

containing 30 ml. additional ether, and the funnel was shaken vigorously. Then, 6 ml. of saturated NaCl solution (containing 1.7 g. of NaCl) was added, and the mixture was shaken vigorously for two minutes. After settling, a three-phase system emerged: a light yellow upper phase, consisting of unsaponifiables in ether; a dark brown middle phase consisting of sodium salts of monobasic acids (including naphthenic acids) dissolved in ether-water mixture; a lower phase containing a water solution of sodium salts of di- tri- and higher polybasic acids. The phases were separated and acidified individually with HCl, and the organic acids thus released were extracted with ether. Each ether extract was dried, yielding the products described below:

*Table IV*

| Original Charge | | Fractional Products | | |
|---|---|---|---|---|
| | | From Upper Phase | From Middle Phase | From Lower Phase |
| Wt. (g.) | 0.84 | 0.10 | 0.40 | 0.34. |
| Percent of Charge | 100 | 11.9 | 47.6 | 40.5. |
| Acid Number | 263 | 39 | 166 | 295. |
| Equivalent Weight | 213 | | 338 | 190. |
| Appearance | Dk. brown color, crystalline. | Yellow color | Very dk. brown; soft, gum. product. | Amber color crystalline. |
| Essential Composition | Mixture of Di-, Tri- and higher polybasic acids and unsap. | Unsap. and color bodies | Monobasic acids, incl. naphthenic acids. | Di-, Tri-, and higher polybasic acids. |

EXAMPLE V

A 6.1 g. portion of mixed complex carboxylic acids derived from solvent extracts having an acid number of 206, was dissolved in 200 ml. of tetrahydrofuran and neu-

*Table III*

| Original Charge | | Fractional Products | | |
|---|---|---|---|---|
| | | From Upper Phase | From Middle Phase | From Lower Phase |
| Wt. (g.) | 3.22 | 0.12 | 2.10 | 1.00. |
| Percent of Charge | 100 | 3.7 | 65.2 | 31.1. |
| Acid No. of Fraction | 218 | 22 | 175 | 296. |
| Equivalent Wt | 257 | | 321 | 190. |
| Appearance | Dk. brown color, crystalline. | Yellow, soft solid | Very dk. brown soft, gum product. | Amber color crystalline. |
| Essential Composition | Mixture of Mono-, Di-, Tri-, and higher polybasic acids. | Unsap. color bodies | Monobasic acids (incl. naphthenic acids). | Di-, Tri-, and higher polybasic acids. |

EXAMPLE IV

An 0.84 g. portion of mixed complex carboxylic acids derived from solvent extracts was pulverized and dissolved tralized with a calculated amount of sodium hydroxide (0.89 g.) in 200 ml. of water. There was no separation of phases. Addition of a considerable amount of sodium chloride resulted in a separation of layers. Phases were then separated and independently acidified. Each acidified product was extracted with ether and the extract stripped. The two products were characterized as follows:

Table V

| Original Charge | | Fractional Products | |
|---|---|---|---|
| | | From Upper Layer | From Lower Layer |
| Wt. (g.) | 6.1 | 3.3 | 2.8. |
| Percent of Charge | 100 | 54 | 46. |
| Acid Number | 206 | 150 | 230. |
| Equivalent Wt | 272 | 374 | 244. |
| Appearance | Dk. brown | Gray | |
| Essential Composition | Mixture of Mono-, Di-, Tri- and higher polybasic acids and unsap. | Monobasic acids and unsap. | Di-, Tri-, and higher polybasic acids. |

As seen from Examples I to IV the process of this invention is effective using different proportions of alkali, solvent and salt, and different processing techniques. In general the proportions of alkali to complex carboxylic acid is at least stoichiometric (Example V), and, preferably, a 1% to 10% excess of alkali is present.

The alkalies used for the process of this invention are preferably alkali metal hydroxides or oxides, i.e., sodium, potassium, lithium, cesium and rubidium hydroxides or oxides.

The ratio of the amount of complex acid to solvent, e.g., ether, is subject to some variation, i.e., about 10 to 50 ml. of solvent per gram of acid mixture. Solvents other than ether and THF that can be used are higher ethers and ketones which have only limited solubility in water. Examples are diamyl ether, methyl isobutyl ether, methyl isoamyl ether, amyl ethyl ketone, methyl nonyl ketone, and hexyl methyl ketone. Other solvents having limited water solubility that may be used are benzyl butyl ether, butyl ethyl ether, t-butyl ethyl ether, ethyl heptyl ether, ethyl octyl ketone, methyl nonyl ketone and 1-phenyl-2-butanone. Other commercially available solvents of this type are known to one skilled in the art. The temperature of the process is about 10° C. to 90° C., depending on the boiling point of solvent, at atmospheric pressure. After the three-phase separation is completed, each phase is individually acidified and extracted with additional ether, which results in separation of acids or unsaponified materials.

The ether extracts of acids or unsaponifiables are evaporated to dryness, and the fractions resulting, of monobasic acids and of di-, tri-, and higher polybasic acids, are more suitable for selected application. Di-, tri-, and higher polybasic acids are much better suited for the preparation of polymers, to cite one example. The monobasic acid fractions are useful for stabilizing DDT solutions and for the preparation of unsaturated polyester resins.

The process of this invention may be somewhat modified by the use of other solvents. When tetrahydrofuran (a cyclic ether) is used instead of ethyl-ether, a two-phase system results. Purifying the fractions so separated gives (1) monobasic acids and unsaponifiables; and (2) di-, tri-, and higher polybasic acids.

The complex carboxylic acid mixtures

The complex carboxylic acids or acid mixtures treated in accordance with this invention are prepared in accordance with the processes disclosed in copending applications, Serial No. 819,932, filed June 12, 1959 by T. W. Martinek, now abandoned, Serial No. 79,661, filed December 30, 1960 by W. E. Kramer, now U.S. Patent No. 3,153,087, L. A. Joo and R. M. Haines, and Serial No. 160,882, filed December 20, 1960 by T. W. Martinek, the details of the processes as disclosed in these copending applications being incorporated herein by reference.

These acids are further described in related copending applications, Serial No. 79,541, filed December 30, 1960 by W. E. Kramer and L. A. Joo, now U.S. Patent No. 3,154,507, and Serial No. 79,506, filed December 30, 1960 by T. W. Martinek.

In accordance with said copending application the complex, polynuclear, aromatic and alkylaromatic carboxylic acids treated in accordance with the process of this invention are derived by metalation, carbonation, and acidification of a source of complex, polynuclear, aromatic sulfur-containing nuclei are represented by (1) solvent extracts obtained in the solvent refining of mineral lubricating oils using a solvent selective for aromatic compounds, (2) hydrogenated and refined solvent extracts, (3) FCC recycle stock and (4) decant oil from the FCC process (the latter feed being described in detail in copending application Serial No. 242,076, filed December 4, 1962.)

The resulting complex acids, hereinafter referred to as extract acids, or EPA, are mixtures of mono-, di-, and polycarboxylic acids. Through chemical analysis, characterization and study of the physical and chemical properties, by way of illustration only, the extract acids can be represented by the following formulae:

Monobasic acids

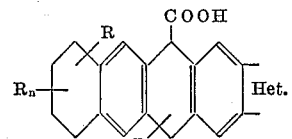

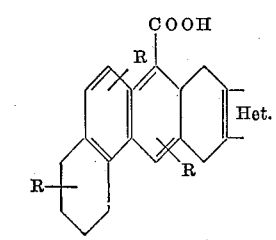

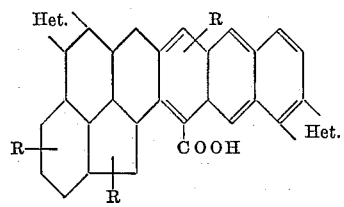

Dibasic acids

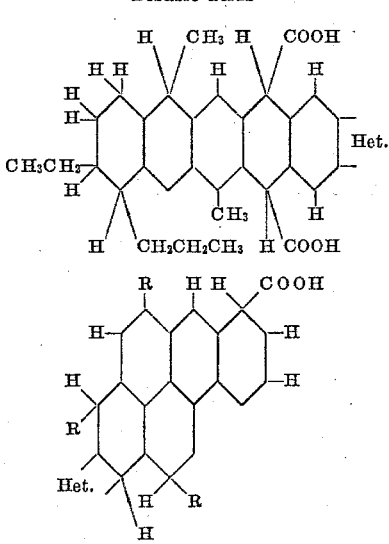

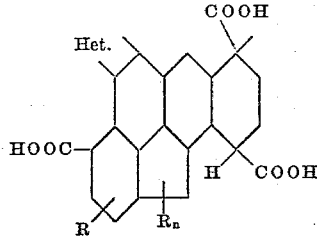

Tribasic acids

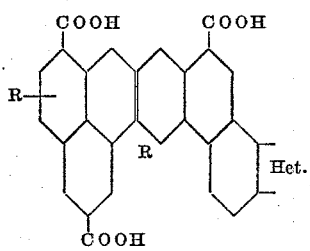

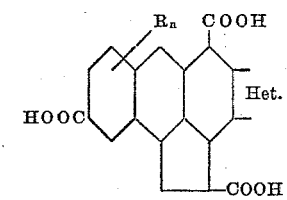

wherein "Het." illustrates one or more S-, or O-containing heterocyclic ring substituents, R is an alkyl or cycloalkyl radical having a total of 5 to 22 carbon atoms for each nucleus, and $n$ has a value of 3 to 10. The molecular weight of the extract acids ranges from about 300 to 750, and the average molecular weight is about 325–470. Table VI gives representative physical and chemical properties of the extract mono-, di- and polycarboxylic acids to be separated in accordance with this invention.

Table VI

| Property: | Value |
| --- | --- |
| Av. mol. wt. range | 325–470. |
| Melting point | 60–100° C. |
| Bromine Number | 4–24. |
| Percent Sulfur | 1.05–2.5. |
| Color | Deep red–dark brown. |
| Percent Unsaponifiables | 2–8. |

In the mixture of acids produced by metalation, carbonation, and acidification of solvent extracts, the monobasic acid derivatives constitute from 5–95% by weight, the dibasic acids constitute from 5–95% by weight and the polybasic acids, that is, those acids containing from 3 to as high as 7 carboxyl groups, make up from 0 to 20% by weight.

Since the preferred source material, namely solvent extracts from the manufacture of mineral lubricating oil, does not lend itself to economical production of the desired complex acids using prior art methods, the preferred methods of preparation set forth in said copending applications will be described and the properties of the acids set forth as example.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and other mixtures and amalgams, at a temperature of about −60° to 80° C. in the presence of a reaction solvent such as dimethyl glycol ether, dimethyl ether, methylalkyl ethers, dialkyl glycol ethers, tetrahydrofuran, methylal and trimethylamine.

The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction caused by impurities, including sulfur compounds, present therein, which tend to cast the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° to 80° C., causing a discharge of the color. This forms the alkali-metal salt of the complex acid which, upon acidification with a mineral acid, such as sulfuric, nitric or hydrochloric acid, yields the desired complex, polynuclear, carboxylic acids in good yields. To illustrate, the following non-limiting examples are given.

EXAMPLE VI

One hundred grams of extract oil No. 19 (Table VIII) from the preparation of 170 vis., 100 VI neutral oil, dissolved in 675 cc. of dry tetrahydrofuran, was reacted with agitation at 10 to 30° C. with 8.3 g. of metallic sodium in the form of $\frac{3}{16}''$ cubes. After 25 minutes, adduct-formation began and a strong color change took place. The product was cooled to −60° C. while an excess of carbon dioxide gas was introduced, resulting in a discharge of the color without precipitation. The 5.1 g. of unreacted sodium was removed, the tetrahydrofuran was vacuum-stripped from the solution, and the remaining liquid was combined with ether and washed with water. Acidification of the aqueous phase and further ether washing resulted in recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

EXAMPLE VII

One hundred grams of extract oil No. 19 (Table VIII) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 g. of alundum balls, 5/16" in diameter, were charged and agitation was started. The solution was cooled to −20° C. and 8.3 g. of sodium, as a 20% dispersion in toluene, were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 g. of extract acid were recovered having a saponification value of 241, indicating an equivalent weight of 233. The acid product contained 2.8% sulfur.

EXAMPLE VIII

The process of Example VII was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average.

EXAMPLE IX

The various recovered acids of application Serial No. 819,932, illustrated in Table VII therein, are further examples of mon-, di- and polycarboxylic acids suitable for separation by this process.

EXAMPLE X

The various carboxylic acid products described in Runs 12 through 47 of application Serial No. 79,661 are further examples of acids that may be separated.

In order to further illustrate the complexity and types of acids separated in accordance with this invention, the following tabulation is given in Table VII:

*Table VII.—Typical properties of a number of example complex acids (EPA)*

| No. | Sap. Value | Mol. Wt. | Percent S | Br. No. | Percent Unsap. | Eq. Wt. | Eqs./Mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102 [1] | | 320 | | | | | | 240 |

[1] This acid was prepared from decant oil: API gravity 15.4°, RI 1.5425. Acid No. 102 contained about 1.5 average number of carboxyl groups per molecule.

The starting material for the reaction to prepare the complex acids may be any complex, polynuclear, and/or heterocyclic aromatic hydrocarbon from petroleum sources. A preferred and unique source of aromatic starting material comprises petroleum fractions as herein defined, not only because the mono-, di-, and polybasic acid products therefrom have unique properties, but also because the techniques outlined herein are particularly adapted to processing these more complex acid mixtures.

The preferred source of complex hydrocarbons comprises the solvent extracts obtained in solvent-refining mineral oils, particularly lubricating oil fractions, using a solvent selective for aromatic compounds.

Since the general process of refining mineral lubricating oils in which solvent extracts are obtained is well known, and is related in detail in said copending applications, it is only necessary for present purposes to give

*Table VIII.—Sources and physical characteristics of solvent extracts*

| Ext. No. | Crude Source | Solvent | API Grav. | Sp. Gr. at 10° F. | Vis/100° F. | Vis/130° F. | Vis/210° F. | V.I. | ° F. Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 Vis neutral, has an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 Vis neutral, has an average molecular weight of 340, contained 87% aromatics, and 13% saturates.

Extract No. 45 was obtained in the production of 160 Vis Bright Stock, contained 92% aromatics and 8% saturates.

some examples by way of illustration. In Table VIII are the physical characteristics of typical extract products, from lubricating oil stocks derived from various crude oils and other source hydrocarbon materials, which may be used to prepare the complex acid mixtures separated in accordance with this invention.

The solvent extracts from lubricating oils used as starting materials to prepare acid mixtures separable in accordance with this invention have the following general properties and characteristics:

*Table IX*

| Characteristic: | Range of value |
|---|---|
| Gravity, ° API | 7.3–18.3 |
| Gravity, sp., 60/60 ° F. | 0.945–1.022 |
| Viscosity SUS @ 210 ° F. | 40–1500 |
| Viscosity index | −128−+39 |
| Pour point (max.) ° F. | +35−+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds, percent by vol. | 20–50 |
| Aromatic compounds, percent by vol. | 25–90 |
| Neutral aromatic hydrocarbons, percent by vol. | 40–51 |
| Av. number of rings/mean arom. mol. | 1.7–5.0 |

In characterizing the complex acids which may be separated by the method of this invention, the molecular weights, sulfur content and average number of aromatic rings per mean aromatic molecule are the selected criterion.

The complexity of the types of compounds present is illustrated by the following table:

*TABLE X.—Estimated chemical composition of solvent extracts Nos. 19, 21, 43 and 44 of Table VIII*

| Type of compound: | Approx. percent by vol. in the extract |
|---|---|
| Saturated hydrocarbons | 12.5 |
| Mononuclear aromatics: | |
| Substituted benzenes | 25.0 |
| Dinuclear aromatics: | |
| Substituted naphthalenes | 30.0 |
| Trinuclear aromatics: | |
| Substituted phenanthrenes | 10.0 |
| Substituted anthracenes | 5.0 |
| Tetranuclear aromatics: | |
| Substituted chrysenes | 00.5 |
| Substituted benzphenanthrenes | 0.2 |
| Substituted pyrenes | 0.2 |
| Pentanuclear aromatics: | |
| Perylene | 0.01 |
| Sulfur compounds,[1] oxygen componds, etc. | 16.5 |

[1] Mainly heterocyclic compounds. The average mol. wt. of Extracts 19 and 21 is 340, and that of Extract 20 is 590.

Any portion of the reactive aromatic constitutents in solvent extracts may be isolated therefrom, or from other sources, to be used as starting materials for the preparation of acid mixtures separable in accordance with this invention. For example, solvent extrcats may be distilled and selected fractions used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated prior to use in preparing the complex carboxylic acids separated in accordance with this invention. Dewaxing can be accomplished by known methods e.g., treatment with 45% MEK and 55% toluene as the dewaxing solvent, using temperatures in the order of −10° F., and solvent/solvent extract ratios of about 8/1. Treatment of one particular extract oil resulted in a dewaxed extract which had a pour point of +5° F. and resulted in the removal of about 2% wax having a melting point of about 130° F. Clay-containing can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silica-alumina catalyst. This same method can be applied to the solvent extracts per se, that is, after separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, −5° F.; vis @ 100° F., 1075 SUS; vis @ 210° F., 58.5 SUS; V.L., −96; neut. No. (1948), 0.05; sulfur, 2.60 wt. percent and C.R. percent, 0.01 The FCC recycle stock is illustrated by the 19% extract (phenol solvent) of FCC recycle stock, which extract had the following properties: ° API, 1.8; sulfur, 1.9 wt. percent; Br. No. 17; R.I. (20° C.) 1.6372 and Engler distillation, −I.B.P.=589° F.; 90%−745° F. The use of these latter starting materials is described in copending application Ser. No. 79,661.

The catalytic cracking of those fractions of crude petroleum oils between diesel burning oil and vacuum residuals furnishes sources of complex, high-molecular-weight polynuclear aromatic and heterocyclic compounds utilizable as alternate feed materials for the preparation of the complex carboxylic acid mixtures to be separated in accordance with this invention. The Orthoflow Fluid Catalytic Cracking process of the M. W. Kellogg Co. is illustrative wherein any of the heaviest virgin gas oils that do not contain excessive heavy metal contents (which cause catalyts poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in accordance with this invention, namely, the FCC cycle stock (or so-called heavy gas oil) and the decant oil. The preparation of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates i.e., heavy gas oils from the distillation of crude oils, in an amount of about 23,750 b.p.s.d., is preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to disuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn as appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed and subjected to catalytic polymerization. The 23,750 b.p.s.d. of feed produces about 11,506 b.p.s.d. of gasoline, 2,381 b.p.s.d. of heating, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 throughput ratio (total charge divided by fresh feed) about 2,840 b.p.s.d. of $C_4$ hydrocarbons, 8,700 b.p.s.d. of $C_5$-400° gasoline, 4,438 b.p.s.d. of 400–600° light FCC cycle stock and 887 b.p.s.d. of decant oil is produced. The catalyst is a silica-alumina fluid cracking catalyst.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1.920 b.p.s.d. of decanted oil and 497 b.p.s.d. of net slurry recycle. The characteristics of the heavy cracked gas oil and decanted oil are shown in the following table.

*Table XI.—Product characteristics*

|  | Heavy FCC Recycle Stock | | Decanted Oil | |
|---|---|---|---|---|
|  | No. 1 | No. 2 | No. 1 | No. 2 |
| Distillation: | | | | |
| ASTM D-1160 at 10 mm.: | | | | |
| IBP, °F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 mm.: | | | | |
| IBP, °F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158: | | | | |
| IBP, °F | 479 | 462 | | |
| 50% | 616 | 618 | | |
| EP | 712 | 712 | | |
| Viscosity, Cs at— | | | | |
| 100° F | 6.16 | 6.16 | [1] 22.0 | [1] 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, °F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point, °F | 155.0 | 154.0 | 154.0 | 153.0 |
| °API | 26.2 | 25.7 | 14.8 | 14.6 |

[1] Extrapolated values.
The catalyst used in these experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which fractions are separated in accordance with this invention. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: °API, 1.8; sulfur, 1.9 wt. percent; br. No., 17; R.I. (20° C.) 1.6372 and Engler distillation, —IBP=589° F.; 90%–745° F. The use of these latter starting materials is described in copending application Ser. No. 79,661, now U.S. Patent No. 3,153,087.

The results of hydrogenation of several of the solvent extracts shown in Table III to product hydrogenated or dewaxed and hydrogenated solvent extracts as starting materials for the preparation of the complex acid mixture and subsequent acid fractionation are shown in Table XII.

*Table XII.—Hydrogenation of solvent extracts and products*

| Reaction Conditions | Run No. | | | | | | | | | Range of Conditions and Product Properties |
|---|---|---|---|---|---|---|---|---|---|---|
|  | 1 | 2 | 3 | 4 | 5 | 6 | 7 | 8 | 9 |  |
| Extract No | 43 | 44 | 44 | 44 | 41 | 43 | [1] 43 | 44 | [1] 44 |  |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., °F | 700 | 700 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | | | | | Filtrol | | | | | |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., °API | 12.8 | 9.4 | 8.5 | 8.8 | 18.5 | 11.8 | 12.9 | 10.1 | 9.7 | 8.0–15.0 |
| Vis at 100° F | 663.7 | 1,133 | 1,457 | 1,452 | 132.5 | 808.7 | 851.1 | 464 | 1,058 | 450–1,500 |
| VI | −33 | −96 | −115 | −114 | −9 | −49 | −52 | −83 | −96 | −120–−9 |

[1] Dewaxed.

Table XII also sets forth the range of conditions and product properties that are generally applicable in the preparation of hydrogenated solvent extracts as starting materials in the preparation of the complex acids to be used in this invention.

Without limiting the invention, the characteristics of the products of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical varies between 5 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures.

Another typical example of an FCC decant oil is one having an API gravity of 15.4°, IBP 375° F. and E.P. 995° F. at atmospheric pressure, cs. vis. @ 100° F. 21.00, cs. vis. @ 210° F. 3.66, percent S, 0.870, Ramsbottom C, 1.70, mol. wt. 320, vis. gr. con. .945, br. No. 8.0. The 47 vol. percent extract from this decant oil has a specific gravity of 1.095, exhibits the same initial boiling point and end boiling point and has the followng characteristics: cs. vis. @ 100° F. 223.5, cs. vis. @ 210° F. 7.80, percent S, 1.44, Ramsbottom C, 5.7, vis. gr. con. 1.03, br. No. 14.0, which is another species of the starting material. Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal. Chem., 28, 1928 (1956)). They are soluble in ethyl ether, acetone, methyl ethyl ketone, tetrahydrofuran, benzene, toluene and xylene.

The acid mixtures derived from sulfur-containing aromatic compounds of petroleum origin treated in accordance with this invention are defined as those acid mixtures having molecular weights above about 300, containing 1.0 to 4.5% by weight of sulfur and having an average of about 1.7 to 5.0 aromatic rings per mean aromatic molecule. The acid mixtures are produced by metalation, carbonation and acidification. The process is applied to either the free acid mixture or the salts resulting from the carbonation step using the techniques outlined herein.

Accordingly, the process of this invention comprises, as applied to the free acids, dissolving the free acid mixture in an excess of about 1% to 10% by weight of aqueous caustic, adding a saturated salt solution and a solvent to affect a phase separation and separating the phases. The method is also applied to the mixture of salts after carbonation, with or without separation of unreacted alkali metal and/or unreacted solvent extract, by dissolving the salt solution in an excess of about 1% to 10% by weight of aqueous caustic, adding a saturated salt solution and a solvent to affect a phase separation, and separating the phases.

In general the monocarboxylic acid fraction separated will have an acid number of about 150 to about 200 and the higher acid number fraction, constituting the lower phase, will have an acid number of about 200 to about 400 or higher.

The embodiments of this invention in which a privilege or property is claimed are defined as follows:

1. The process of fractionating a complex mixture of carboxylic acids derived from sulfur-bearing aromatic compounds obtained by the sequential metalation with an alkali metal, carbonation and acidification of a petroleum fraction from the group consisting of solvent extracts obtained in the solvent extraction of mineral lubricating oils with a solvent selective for aromatic compounds, such solvent extracts which have been hydrogenated, fluid catalytic cracked recycle stock and decant oil from a fluid catalytic cracking process which comprises dissolving said mixture of acids in an excess of aqueous alkali metal hydroxide, adding to the resulting solution a saturated salt solution and an organic solvent in which the unsaponifiable constituents of said mixture are soluble, the di- and polycarboxylic salts are relatively insoluble and which has only limited solubility in water, in sufficient amounts to effect phase separation between monocarboxylic acid salts and salts of di- and polycarboxylic acids, and separating the resulting phases richer in monocarboxylic acid salts and in di- and polycarboxylic acid salts, respectively.

2. The process in accordance with claim 1 in which the organic solvent is one which brings about separation into three phases, comprising an organic solvent phase containing said unsaponifiable constituents, an intermediate mixed organic solvent-water phase containing the monocarboxylic acid salts and a water phase containing the di- and polycarboxylic acid salts.

3. The process in accordance with claim 1 in which said complex carboxylic acids contain from 1 to 7 carboxyl groups per molecule and are characterized by having a molecular weight of above about 300 to 750, containing about 1.0 to 4.5 wt. percent of sulfur, and having an average of about 1.7 to 5.0 aromatic rings per mean aromatic molecule.

4. The process in accordance with claim 1 in which said mixture of complex carboxylic acids is derived from sulfur-containing aromatic compounds of the group consisting of solvent extracts obtained in the solvent refining of mineral lubricating oils using a solvent selective for aromatic compounds.

5. The process in accordance with claim 2 in which said organic solvent is a solvent of the group consisting of ethers and ketones.

6. The process in accordance with claim 5 in which said solvent is diethylether.

7. The process in accordance with claim 1 in which said salt is a water soluble alkali metal salt of an inorganic acid.

8. The process in accordance with claim 13 in which said complex carboxylic acid salts contain from 1 to 7 carboxylate groups per molecule and are characterized by having an average molecular weight of above about 300 to 750, by containing about 1.0 to 4.5 wt. percent of sulfur and by having an average of about 1.7 to 5.0 aromatic rings per mean aromatic molecule.

9. The process in accordance with claim 13 in which said mixture of complex carboxylic acid salts is derived from sulfur-containing aromatic compounds of the group consisting of solvent extracts obtained in the solvent refining of mineral lubricating oils using a solvent selected for aromatic compounds.

10. The process in accordance with claim 13 in which said solvent is an ether.

11. The process in accordance with claim 13 in which an upper phase consisting essentially of a solvent solution of color bodies and unsaponifiables, a middle phase consisting essentially of a solvent-water solution of predominantly monocarboxylic complex acids and a lower phase consisting essentially of an aqueous solution of di-, tri-, and higher complex carboxylic acids are separated.

12. The process in accordance with claim 13 in which organic solvent is tetrahydrofuran and in which said phase separation results in the separation of two phases, the top phase consisting essentially of a solvent phase containing monocarboxylic acid salts and unsaponifiables and a lower aqueous phase consisting essentially of di-, tri-, and higher polycarboxylic acid salts.

13. The process of fractionating a complex mixture of salts of carboxylic acids derived from sulfur-containing compounds obtained by the sequential metalation with an alkali metal and carbonation of a petroleum fraction from the group consisting of solvent extracts obtained in the solvent extraction of mineral lubricating oils with a solvent selective for aromatic compounds, such solvent extracts which have been hydrogenated, fluid catalytic cracked recycle stock and decant oil from a fluid catalytic cracking process which comprises dissolving said mixture of salts in aqueous alkali metal hydroxide solution, adding to the resulting solution a saturated salt solution and an organic solvent in which the unsaponifiable constituents of said mixture are soluble, the di- and polycarboxylic salts are relatively insoluble and which has only limited solubility in water, in sufficient amounts to effect phase separation between monocarboxylic acid salts and salts of di- and polycarboxylic acids, and separating the resulting phases richer in monocarboxylic acid salts and in di- and polycarboxylic acid salts, respectively.

14. The process in accordance with claim 13 in which said salts of carboxylic acids are sodium salts, said alkali metal hydroxide is sodium hydroxide and said salt solution is a sodium chloride solution.

References Cited by the Examiner

UNITED STATES PATENTS

| | | | |
|---|---|---|---|
| 1,822,016 | 5/1930 | Daniels | 260—525 |
| 2,422,794 | 2/1943 | McCorquodale et al. | 260—452 |
| 2,762,840 | 9/1956 | Howard | 260—525 |
| 3,153,087 | 10/1964 | Kramer et al. | 260—327 |

OTHER REFERENCES

Lochte et al.: The Petroleum Acids and Bases, Chem. Pub. Co., New York (1955), pages 20 and 68.

Vogel Practical Organic Chem., Longmans, Green and Co., New York, third ed. (1957), page 260.

WALTER A. MODANCE, *Primary Examiner.*

JOHN D. RANDOLPH, *Examiner.*